United States Patent [19]

Renaud

[11] Patent Number: 4,537,294
[45] Date of Patent: Aug. 27, 1985

[54] CLUTCH RELEASE BEARING WITH SPACER MEMBER

[75] Inventor: Pierre Renaud, Le Plessis-Trevise, France

[73] Assignee: VALEO, Paris, France

[21] Appl. No.: 463,849

[22] Filed: Feb. 4, 1983

[30] Foreign Application Priority Data

Feb. 5, 1982 [FR] France .................. 82 01870

[51] Int. Cl.³ .................. F16D 23/14; F16C 19/10
[52] U.S. Cl. .................. 192/98; 192/110 B; 403/329; 384/535
[58] Field of Search .................. 192/98, 110 B; 308/184 R; 403/329; 384/535

[56] References Cited

U.S. PATENT DOCUMENTS

| 1,328,488 | 1/1920 | Bowden | 403/329 X |
| 1,841,647 | 1/1932 | Smith | 403/329 X |
| 1,965,325 | 7/1934 | Tower | 192/110 B X |
| 3,333,664 | 8/1967 | Chapaitis | 192/98 |
| 3,904,008 | 9/1975 | Sonnerat | 192/98 |
| 3,951,244 | 4/1976 | Neder | 192/98 |
| 4,099,605 | 7/1978 | Ernst et al. | 192/98 |
| 4,117,916 | 10/1978 | Baker | 192/98 |
| 4,186,828 | 2/1980 | Renaud | 192/98 |
| 4,228,881 | 10/1980 | Nakamura | 192/98 |
| 4,276,974 | 7/1981 | Ladin | 192/98 |
| 4,305,492 | 12/1981 | Mori et al. | 192/110 B X |
| 4,351,427 | 9/1982 | Miyahara | 192/110 B X |
| 4,433,768 | 2/1984 | Olschewski et al. | 192/110 B X |

FOREIGN PATENT DOCUMENTS

| 1286834 | 1/1969 | Fed. Rep. of Germany | 192/98 |
| 2303421 | 8/1973 | Fed. Rep. of Germany | |
| 2844493 | 4/1979 | Fed. Rep. of Germany | 192/98 |
| 809752 | 3/1937 | France | |
| 2125871 | 9/1972 | France | |
| 2255501 | 7/1975 | France | 192/98 |
| 2364364 | 4/1978 | France | |
| 2452635 | 10/1980 | France | |
| 2454017 | 11/1980 | France | |
| 0121350 | 9/1979 | Japan | 192/110 B |
| 1421030 | 1/1976 | United Kingdom | 192/98 |
| 1454790 | 11/1976 | United Kingdom | 192/98 |
| 2073353 | 10/1981 | United Kingdom | 192/98 |

Primary Examiner—Rodney H. Bonck
Assistant Examiner—David D. House
Attorney, Agent, or Firm—Charles A. Brown; Charles E. Brown

[57] ABSTRACT

A clutch release bearing is disclosed comprising an operating member controlled by an actuating member, e.g., a release fork, a drive member attached axially to the operating member and responsive to the operating member for coacting with a clutch release mechanism, e.g., a clutch diaphragm spring. The operating member has a metal axial sleeve which is received on a guide member and a metal transverse flange bearing on one side against the actuating member and on the other side against the drive member. A spacer member of synthetic material is interposed axially between the flange and the drive member and detents or elastically deformable pawls are operably disposed between the spacer member and the sleeve for fixing the spacer member in axial position thereon. The detents or pawls may be formed between axial slots in the inner wall of the spacer member. The outer wall has an annular transverse land against which the drive member, for example, the outer race of a ball bearing, may bear.

14 Claims, 3 Drawing Figures

CLUTCH RELEASE BEARING WITH SPACER MEMBER

FIELD OF THE INVENTION

The present invention relates generally to clutch release bearings, in particular, for automotive clutches.

BACKGROUND OF THE INVENTION

As is known, a clutch release bearing generally comprises an operating member controlled by an actuating member, in particular a clutch release fork, a drive member axially attached to the operating member and responsive to axial displacement of the operating member for coacting with the clutch release mechanism which is normally a diaphragm spring.

The present invention relates more particularly to such clutch release bearings in which the operating member comprises an axial sleeve which is received on a guide member and a transverse flange for bearing against the actuating member on one side and against the drive member on the other, opposite side. For construction requirements the sleeve and the flange must be at least partly made of metal, for example, as regards the sleeve, to provide sufficient mechanical strength or the desired coefficient of friction relative to the guide member, and as regards the flange, to have a sufficient wear resistance owing to contact with the actuating member.

As for the drive member, it may, as is common, comprise a ball bearing having one race which bears axially, directly or indirectly, against the operating member, and another race which defines the active or drive portion of the drive member must bear at its free end against the clutch release mechanism.

A difficulty arises in the construction of such clutch release bearings when the actuating member and the clutch release mechanism are axially distant from each other, the flange of the operating member against which the actuating member bears must be axially distant from the drive portion of the drive member which must bear against the clutch release mechanism.

A considerable axial distance between the flange of the operating member and the active end of the drive member must be taken up.

In French Pat. No. 72 03606, issued Sept. 29, 1972, a metal spacer is interposed axially between the flange of the operating member and the drive member. But with such a spacer which carries the drive member it is then necessary to insure axial positioning of the sleeve on the operating member. In this French patent the spacer is axially positioned by a bead formed in the sleeve which in practice must be made of sheet metal of sufficiently thin gage to permit the bead to be formed therein. Beside the fact that such a sheet metal sleeve may not be suitable for applications, the bead is not necessarily easy to form in the sidewall of the sleeve.

In French patent publication No. 2,454,017, published Apr. 9, 1980, a molded plastic spacer is fixed on the sleeve and the flange of the operating member. The construction is all the more complicated by the fact that the spacer is not separate from the sleeve and the flange, and various expedients must be taken to insure the securement of the drive member.

SUMMARY OF THE INVENTION

It is a general object of the invention to provide a clutch release bearing which overcomes the shortcomings of the prior art briefly described above.

According to the invention, there is provided a clutch release bearing for an automotive clutch having a clutch release mechanism, of the type comprising an operating member adapted to be controlled by an actuating member such as a release fork, a drive member attached axially to the operating member and responsive to the operating member for coacting with the clutch release mechanism such as a diaphragm spring, the operating member having an axial sleeve adapted to be received on a guide member and a transverse flange adapted to bear axially against the actuating member on one side and the drive member on the opposite side, a spacer member interposed axially between the flange of the operating member and the drive member. The improvement of the clutch release bearing is characterized by detent means operably disposed between the spacer member and the sleeve for fixing the spacer member axially in position on the sleeve.

The resulting clutch release bearing is very simple to manufacture and assemble.

It is thus advantageously possible, while complying with constructional requirements, to make the spacer member of the axial length necessary so that the associated drive member may be economically equipped with a standard ball bearing, if desired, without substantially increasing the weight of the clutch release bearing.

Thereupon such a ball bearing has a normal overhang or projection and the resilient means used for axially securement to the operating member may be of the usual type, e.g. a clip. This axial securement may be very simply effected by means of the spacer member which for this purpose may have peripherally spaced hooks or claws adapted to retain the clip.

In addition, when the clutch release bearing is a self-centering clutch release bearing, and more particularly a sustained or permanent self-centering clutch release bearing, the drive member bears axially against a plastic and not a metal component, the movement of the drive member in any direction in a plane transverse or perpendicular to the axis of the clutch release bearing for permitting self-centering.

Further, the drive member thus attached to the spacer member and carried thereby projects from the spacer member beyond the corresponding end of the sleeve of the operating member. The diameter of the inner race of the ball bearing, which the drive member may comprise, as is conventional, may advantageously be less than the outer diameter of the sleeve thereby contributing to the reduction of the overall diameter of the clutch release bearing.

According to a preferred embodiment the detent means cooperating between the spacer member and the sleeve of the operating member for fixing the spacer member axially in position thereon comprises at least one elastically or resiliently deformable tab or pawl which is part of the annular wall of the spacer member defined between circumferentially spaced axial slots therein. The pawl or tab may have means such as a boss or recess for engagement with cooperable means such as a recess or boss provided on the sleeve.

In addition to the detenting function of such an elastically deformable pawl or tab, it may advantageously have a second function which is to compensate for the inevitable play between the spacer member and the operating member by means of its inherent elasticity defining a radially inward bias. When the release bearing is of the sustained self-centering variety such an assembly is normally necessary when the spacer member is made of plastic or other synthetic material owing to the coning of the spacer member after molding, which may be detrimental to the sought-after centering action.

Taking advantage of the elastically deformable tabs or pawls used for the detenting of the spacer member on the sleeve of the operating member, such a drawback may be obviated since the spacer member is, on the contrary, securely held on the sleeve by the tabs or pawls. Of course, such a result may be obtained by means of elastically deformable tabs or pawls which, like the previous ones, are part of the inner annular wall of the spacer member and which, for example, circumferentially alternate with the same.

In any event, the inner annular wall of the spacer member and therefore the tabs or pawls thereon are in mild frictional engagement or define a snug fit with the sleeve of the operating member.

Moreover, according to the preferred embodiment, the flange of the operating member comprises a part separate from the sleeve with which it is associated and for axially holding the flange relative to the sleeve it bears against an annular transverse shoulder of the sleeve, while being held axially in contact with the said shoulder by a ring member which is received on the sleeve and fixed axially in position thereon, for example, by crimping.

Such an arrangement advantageously requires a relatively thin gage sleeve which reduces the amount of material used, and since it is metal results in a not insubstantial reduction in weight of the entire clutch release bearing. Indeed, during clutch disengagement, the crimp has to transmit only the force necessary for axial displacement of the release bearing, which is moderate, whereby it may in fact be formed on a relatively thin-walled part.

If necessary, for improving the sliding conditions during axial displacement of the release bearing, the sleeve of the operating member, although made of metal, may have a plastic liner over at least part of its inner surface for contact with the guide member on which the sleeve is received.

At all events, the flange of the operating member of the release bearing may advantageously comprise a standard flange which is suitable for clutch release bearing of different lengths, for example, which advantageously reduces manufacturing and storage costs.

These and other features and advantages of the invention will be brought out in the description which follows, given by way of example, with reference to the accompanying drawings.

DESCRIPTION OF THE PREFERRED EMBODIMENT

Figure 1:
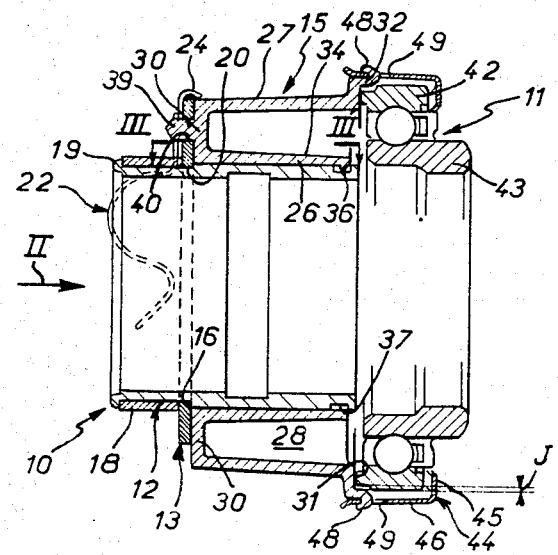
FIG. 1 shows an axial sectional view of a clutch release bearing embodying the invention, taken along line I—I in FIG. 2.
Figure 2:
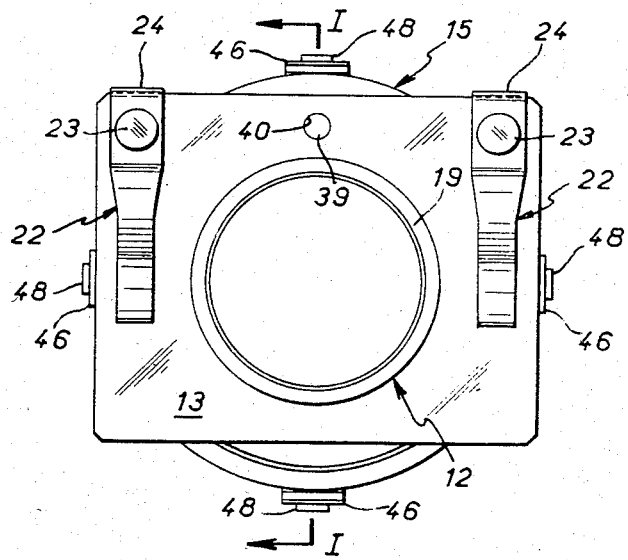
FIG. 2 is an end elevational view taken in the direction of arrow II in FIG. 1.

As shown in the drawings the clutch release bearing is of the type comprising, generally, an operating member 10 which is coupled with and adapted to be controlled by an actuating member which is in practice a release fork (not shown) and a drive member 11 attached axially to the operating member 10, as explained below, and responsive to axial movement of the latter for coacting with a clutch release mechanism such as a clutch diaphragm spring, also not shown.

Further, the operating member 10 is of the type comprising an axial sleeve 12 slidingly received on a guide member (not shown) and a transverse flange 13 on one side (left side in FIG. 1) of which bears the actuating member and on the other side (right side in FIG. 1) of which bears the drive member.

The sleeve 12 and the flange 13 of the operating member 10 are at least in part made of metal, and between the flange 13 and the drive member 11 is axially interposed a spacer member 15. In the illustrated embodiment the sleeve 12 and the flange 13 are both entirely made of metal. Alternatively, however, the sleeve 12 may have a plastic or other synthetic material liner for improving, if necessary, the sliding contact with the guide member on which the sleeve is received.

In any event, in the preferred embodiment the flange 13 comprises a component separate from the sleeve 12, and for its axial securement relative to the sleeve it bears on the side remote from the drive member axially against an annular transverse shoulder 16, on the same side of the sleeve 12, while being held axially in contact with the annular shoulder 16 by means of a ring 18. The ring 18 is received on the sleeve 12 and axially held in position thereon, for example, by crimping, such as illustrated, a crimp 19 being formed at the end of the sleeve 12 remote from the drive member 11, in contact with the corresponding edge of the ring 18. A long guiding zone which is compatible with good flange securement and small wall thickness of sleeve 12 is thus obtained.

Alternatively, no such ring 18 may be used and the flange 13 may be held directly in contact with shoulder 16 on sleeve 12 by a crimp (not illustrated) formed by driving material from the end of the sleeve remote from the drive member.

In the illustrated embodiment the flange 13 which is received on the sleeve 12 has a central opening 20 of circular contour and a rectangular outer periphery.

For attaching the release bearing to the associated actuating member, the flange 13 has, as shown, two tabs 22 on the side remote from the drive member 11 which are disposed symmetrically with respect to the vertical axial plane of the release bearing. The tabs 22 are parallel to each other and each is fixed to the flange 13 by a rivet 23 and has bent-over lug 24 by which it is hooked onto the near edge of the flange 13 for preventing its rotation.

The spacer member 15 is advantageously made of plastic or other synthetic material. In the illustrated embodiment the spacer member 15 is of one-piece construction and comprises an inner annular wall 26, an outer annular wall 27, and substantially radial ribs 28 interconnecting the annular walls 26, 27. The inner annular wall 26 of the spacer member 15 is received, for example, with a snug fit, or a mild frictional engagement, on the sleeve 12 of the operating member 10.

Further, at its end opposite the drive member 11 the spacer member 15 has a transverse endwall 30 from which extend the ribs 28 and by which the spacer member 15 bears against the flange 13 of the operating member 10. As illustrated, the spacer member 15 bears against the flange 13 along a continuous surface. Alternatively, the spacer member 15 may bear along a discontinuous or broken surface, the spacer member 15 having in this event spaced contact bosses (not shown) protruding from its endwall.

At the end adjacent drive member 11 the spacer member 15 has an annular transverse land 31 for bearing against the drive member which land is provided on the outer annular wall 27. The annular transverse land 31 is delimited peripherally by an axial rim 32 directed toward the drive member 11 for radially retaining the latter. Since the release bearing is of the self-centering variety, annular clearance J is left between the drive member 11 and the axial rim 32 of the spacer member 15.

According to a feature of the invention, the position of the spacer member 15 which bears axially against the flange 13 of the operating member 10 is fixed axially on the sleeve 12 by detent means cooperable between the inner annular wall 26 and the sleeve 12. In the illustrated embodiment of the invention the detent means comprises at least one elastically or resiliently deformable tab or pawl 34 which is part of the inner annular wall 26 of the spacer member 15, circumferentially delimited by axial slots 35 in the inner annular wall 26, and which therefore extends axially.

Figure 3:
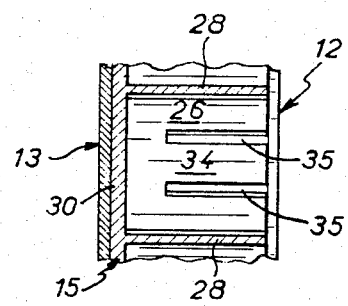
FIG. 3 shows, laid out flat, a partial circumferential sectional view taken along line III—III in FIG. 1.

Three such tabs or pawls 35 may be provided, circumferentially equidistant from one another, each between and spaced from two radial ribs 28 (see FIG. 3).

Each of the axial tabs or pawls 34 extends along the greater part of the corresponding portion of the inner annular wall 26 of the spacer member 15 and has at its free end a means such as a boss or recess adapted to engage complementary means such as a recess or boss provided on the sleeve 12 of the operating member for this purpose.

In the illustrated embodiment each elastically deformable tab or pawl 34 has a projection 36 defining a boss at its free end facing the sleeve 12 for cooperation with a groove 37 extending circularly along the inner surface of sleeve 12 thus defining a common recess for all the elastically deformable tabs or pawls 34. On assembly, the elastically deformable tabs or pawls 34 are momentarily elastically deformed and they resume their initial configuration when then projections 36 snap into the groove 37 in sleeve 12. The projections 36 on the elastically deformable tabs or pawls 34 then penetrate into the groove 37, any rearward or return movement of the spacer member 15 is prevented, as the spacer member is fixed in axial position on the sleeve 12.

As mentioned above, owing to their elasticity, the tabs or pawls 34 advantageously compensate for the inevitable play between the spacer member 15 and the sleeve 12 by light elastic clamping action.

Alternatively, a similar result may be obtained by other elastically deformable tabs or pawls, formed like the preceding ones and alternating therewith, in the inner annular wall 26 of the spacer member 15.

In the illustrated embodiment of the invention the spacer member 15 is, in addition, fixed in angular position on the flange 13 of the operating member for sustaining the self-centering action. For this purpose the spacer member 15 has at least one locating pin 39 protruding axially from the outer side of the endwall 30 and engaged in a complementary aperture 40 formed in the flange 13.

As is known per se, the drive member 11 comprises, in the illustrated embodiment, a ball bearing, of a standard type, which protrudes beyond or overhangs from the spacer member 15. In the illustrated embodiment the ball bearing extends axially beyond the end of the sleeve 12. The outer race 42 of the ball bearing bears axially against the annular transverse land 31 on the spacer member 15. The inner race 43 extends sufficiently outwardly to bear against the release mechanism of the associated clutch.

As is known per se, the thus-constructed drive member 11 is attached to the operating member 10 by a clip 44. Since the illustrated clutch release bearing is of the sustained self-centering type, the clip 44 is resilient and comprises a resilient endwall 45 which bears against the outer race 42 of the ball bearing of the drive member 11. In the illustrated embodiment the resilient endwall is a corrugated or undulated spring washer such as sold under the trade name Onduflex, and a plurality of lugs 46, four as shown, extend axially from the endwall 45 and are integrally formed therewith for attaching the clip to the operating member 10.

In the illustrated embodiment the spacer member 15 comprises an equal number of circumferentially spaced hooks or claws 48 for retaining the resilient clip 44 by cooperation with the lugs 46. Each of the lugs 46 has an opening 49 through which an associated hook 48 is adapted to extend. Thus, the spacer member 15 actually carries the drive member 11.

Of course the present invention is not intended to be limited to the illustrated and described embodiment but, rather, admits of all variations and alternatives understood to those skilled in the art without departing from the scope of the appended claims.

In particular, instead of the projections on the elastically deformable tabs or pawls, the latter may be provided with openings cooperable with respective hooks or claws on the sleeve in registry therewith. Alternatively, tabs may cooperate with an annular rib projecting from the sidewall of the sleeve.

Moreover, although the drive member is provided with a ball bearing, as an alternative, drive member may comprise a simple ring made, for example, of a mixture of a thermosetting resin, a lubricating charge and nonfusible synthetic fibers.

Finally, in the case the drive member comprises a ball bearing a viscoelastic element may be interposed between the ball bearing and the operating member.

What is claimed is:

1. A clutch release bearing for an automotive clutch having a clutch release mechanism, said clutch release bearing comprising an operating member adapted to be controlled by an actuating member, a drive member attached axially to said operating member and being responsive to the said operating member for coacting with the clutch release mechanism, said operating member having an axial sleeve adapted to be received on a guide member and a transverse flange adapted to bear axially against the actuating member on one side and said drive member on the opposite side, said drive member being substantially axially spaced from said transverse flange, a spacer member slidably received on said sleeve and interposed axially between said flange and said drive member, said spacer member maintaining said drive member in axially spaced relationship relative to said transverse flange; the improvement wherein resilient detent means are operably disposed between said spacer member and said sleeve for fixing said spacer member axially in position on said sleeve.

2. The clutch release bearing of claim 1, wherein said resilient detent means comprises at least one elastically deformable pawl which is part of said spacer member, said pawl having a member cooperable with another member provided on said sleeve, a selected one of the latter two members being a boss and the nonselected one being a recess therefor.

3. The clutch release bearing of claim 2, wherein said spacer member comprises an inner annular wall received on said sleeve, and said pawl being formed as part of said inner annular wall defined circumferentially between axial slots in said inner annular wall.

4. The clutch release bearing of claim 3, wherein said spacer member inner annular wall is in mild frictional engagement on said sleeve.

5. The clutch release bearing of claim 3, wherein said spacer member is of one-piece construction and further comprises an outer annular wall radially spaced from said inner annular wall, and substantially radial circumferentially spaced ribs interconnecting said inner and outer annular walls.

6. The clutch release bearing of claim 1, wherein said spacer member comprises an inner annular wall in mild frictional engagement on said sleeve.

7. The clutch release bearing of claim 1, wherein said spacer member is of one-piece construction and comprises an inner annular wall, an outer annular wall radially spaced from said inner wall, and substantially radial ribs interconnecting said inner and outer annular walls.

8. The clutch release bearing of claim 1, wherein said spacer member comprises an annular transverse land against which said drive member bears, a rim defining the outer periphery of the annular transverse land, radial clearance being provided between the outer periphery of said drive member and said rim for permitting self-centering of said drive member relative to the axis of the associated clutch.

9. The clutch release bearing of claim 1, wherein a clip member attaches said drive member to said operating member, said spacer member comprising circumferentially spaced claws for retaining said clip member.

10. The clutch release member of claim 1, further comprising a locating pin on said spacer member for cooperating with a complementary aperture in said flange for angularly fixing the position of said spacer member on said flange.

11. The clutch release bearing of claim 1, wherein said spacer member is made of synthetic material.

12. The clutch release bearing of claim 1, wherein said flange is separate from said sleeve of said operating member, a transverse shoulder on said sleeve for axially maintaining said flange with respect thereto, and a ring member received on said sleeve for axially maintaining said flange in contact with said shoulder, and means for axially positioning said ring member on said sleeve.

13. The clutch release bearing of claim 1, wherein said spacer member comprises an inner annular wall received on said sleeve and an outer annular wall radially spaced from said inner annular wall, said detent means being provided on said inner annular wall in cooperation with a boss defined on said sleeve.

14. The clutch release bearing according to claim 1, wherein said resilient detent means further defining radial bias means for compensating for any play between the spacer member and the sleeve of the operating member.

* * * * *